(12) United States Patent
Bertrand et al.

(10) Patent No.: US 12,452,020 B2
(45) Date of Patent: Oct. 21, 2025

(54) TRANSMISSION OF SOUNDING REFERENCE SIGNAL AND SCHEDULING REQUEST IN SINGLE CARRIER SYSTEMS

(71) Applicant: Texas Instruments Incorporated, Dallas, TX (US)

(72) Inventors: Pierre Bertrand, Antibes (FR); Zukang Shen, Richardson, TX (US); Jing Jiang, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/615,428

(22) Filed: Mar. 25, 2024

(65) Prior Publication Data
US 2024/0235789 A1 Jul. 11, 2024

Related U.S. Application Data

(63) Continuation of application No. 17/234,651, filed on Apr. 19, 2021, now Pat. No. 11,943,162, which is a continuation of application No. 15/895,222, filed on Feb. 13, 2018, now Pat. No. 10,985,887, which is a
(Continued)

(51) Int. Cl.
*H04L 5/00* (2006.01)
*H04W 72/21* (2023.01)
*H04W 72/23* (2023.01)

(52) U.S. Cl.
CPC .......... *H04L 5/0053* (2013.01); *H04L 5/0051* (2013.01); *H04W 72/21* (2023.01); *H04L 5/0058* (2013.01); *H04W 72/23* (2023.01)

(58) Field of Classification Search
CPC ... H04L 5/0053; H04L 5/0051; H04L 5/0058; H04W 72/21; H04W 72/23
See application file for complete search history.

(56) References Cited

U.S. PATENT DOCUMENTS

2006/0215677 A1  9/2006  Basso
2007/0293233 A1  12/2007  Inoue
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.6.0, Sep. 2008 (137 pages).
(Continued)

*Primary Examiner* — Kiet Tang
(74) *Attorney, Agent, or Firm* — Zhenhai Fu; Frank D. Cimino

(57) ABSTRACT

A transmission of information from a secondary to a primary node occurs in a plurality of transmission instances which are logical time durations. A secondary node receives an allocation of periodic transmission instances for a scheduling request indicator (SRI) and an allocation if periodic transmission instances for a sounding reference signal (SRS). In a particular transmission instance allocated for the transmission of both SRS and SRI, the secondary node transmits the SRI without transmitting the SRS if the SRI indicates a pending scheduling request; otherwise, the secondary node transmits the SRS without transmitting the SRI.

32 Claims, 11 Drawing Sheets

Related U.S. Application Data continuation of application No. 12/254,064, filed on Oct. 20, 2008, now Pat. No. 9,893,859.

(60) Provisional application No. 61/022,881, filed on Jan. 23, 2008, provisional application No. 61/022,589, filed on Jan. 22, 2008, provisional application No. 60/983,681, filed on Oct. 30, 2007.

(56) References Cited

U.S. PATENT DOCUMENTS

| | | | | |
|---|---|---|---|---|
| 2009/0116434 A1* | 5/2009 | Lohr | ............... | H04L 5/0064 370/329 |
| 2010/0103902 A1* | 4/2010 | Kim | ............... | H04L 5/0055 370/344 |
| 2011/0216713 A1* | 9/2011 | Kim | ............... | H04L 5/0053 370/329 |

OTHER PUBLICATIONS

"3rd Generation Partnership Project; Technical Specification Group Radio Access Network; Evolved Universal Terrestrial Radio Access (E-UTRA) Radio Resource Control (RRC); Protocol specification (Release 8)," 3GPP TS 36.331 V8.3.0, Sep. 2008 (178 pages).

"3rd Generation Partnership Project; Technical Specification Group Radio Access Network; Evolved Universal Terrestrial Radio Access (E-UTRA); Physical Channels and Modulation (Release 8)," 3GPP TS 36.211 V8.4.0, Sep. 2008 (78 pages).

"3rd Generation Partnership Project; Technical Specification Group Radio Access Network; Evolved Universal Terrestrial Radio Access (E-UTRA); Physical Channels and Modulation,(Release 8)" 3GPP TS 36.211, V8.0.0, Sep. 2007, 50 pages.

"Patent Prosecution History," U.S. Appl. No. 12/254,064, filed Oct. 20, 2008, 317 pages.

"Patent Prosecution History," U.S. Appl. No. 15/895,222, filed Feb. 13, 2018, 285 pages.

"Patent Prosecution History," U.S. Appl. No. 17/234,651, filed Apr. 19, 2021, 253 pages.

3GPP TS 36.213, V8.0.0, 3rd Generation Partnership Project; Technical Specification Group Radio Access Network; Evolved Universal Terrestrial Radio Access (E-UTRA); Physical Layer Procedures (Release 8); Valbonne, France; Sep. 2007, 13 pages.

3GPP TSG RAN WG1 #48bis; R1-071662; St. Julian's, Malta; "Uplink Scheduling Request for LTE;" Mar. 26-30, 2007, 4 pages.

3GPP Tsg Ran WG1 #50; R1-073834; Athens, Greece; "Proposed PUCCH slot format considering S-RS transmission;" Aug. 20-24, 2007; 7 pages.

3GPP TSG RAN WG1 #50bis; R1-074205; Shanghai, China; Scheduling Request (SR) design considering PUCCH structure; Oct. 8-12, 2007; 6 pages.

3GPP TSG RAN WG1 Meeting #50; R1-073517; Athens, Greece; "Uplink Sounding Reference Signal in E-UTRA;" Aug. 20-24, 2007, 2 pages.

3GPP TSG RAN WG1 Meeting #50; R1-073642; Athens, Greece; "UL Sounding Arrangement;" Aug. 20-24, 2007; 5 pages.

3GPP TSG-RAN WG2 #59bis; R2-074064; Shanghai, China; "Scheduling Request in E-UTRAN," Oct. 8-12, 2007; 3 pages.

Dahlman, Erik, Email to 3GPP RAN1 working group (3GPP_TSG_RAN_WG1) dated Jan. 20, 2008, Re: [LTE] L1 parameters + LS to RAN2, available at: https://list.etsi.org/scripts/wa.exe?A2=3GPP_TSG_RAN_WG1; e4dff066.0801C&S= (18 pages).

Papasakellariou, Aris, Email to 3GPP RAN1 working group (3GPP_TSG_RAN_WG1) dated Jan. 12, 2008, Re: [LTE]: UL RS Draft Summary, available at: https://list.etsi.org/scripts/wa.exe?A2=3GPP_TSG_RAN_WG1;2f89d6e7.0801B&S= (5 pages).

Papasakellariou, Aris, Email to 3GPP RAN1 working group (3GPP_TSG_RAN_WG1) dated Jan. 13, 2008, [LTE]: UL RS email discussion summary—Final, available at: https://list.etsi.org/scripts/wa.exe?A2=3GPP_TSG_RAN_WG1;f291ab41.0801B&S= (5 pages).

* cited by examiner

TRANSMISSION OF SOUNDING REFERENCE SIGNAL AND SCHEDULING REQUEST IN SINGLE CARRIER SYSTEMS

This application is a continuation of U.S. patent application Ser. No. 17/234,651 filed Apr. 19, 2021, which is a continuation of U.S. patent application Ser. No. 15/895,222 filed Feb. 13, 2018 (now U.S. Pat. No. 10,985,887 granted Apr. 20, 2021), which is a continuation of U.S. patent application Ser. No. 12/254,064 filed Oct. 20, 2008 (now U.S. Pat. No. 9,893,859 granted Feb. 13, 2018), which claims the benefit of U.S. Provisional Application No. 60/983,681 filed Oct. 30, 2007; U.S. Provisional Application No. 61/022,589 filed Jan. 22, 2008; and U.S. Provisional Application No. 61/022,881 filed Jan. 23, 2008. Each of the above-mentioned applications is incorporated herein by reference in its entirety.

FIELD OF THE INVENTION

This invention generally relates to wireless cellular communication, and in particular to transmission of reference signals in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Long Term Evolution (LTE) wireless networks, also known as Evolved Universal Terrestrial Radio Access Network (E-UTRAN), are being standardized by the 3GPP working groups (WG). OFDMA and SC-FDMA (single carrier FDMA) access schemes were chosen for the down-link (DL) and up-link (UL) of E-UTRAN, respectively. User Equipments (UE's) are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station (also referred to as NodeB) responds with allocated UL resource and timing advance information to allow the UE to transmit on the PUSCH. The 3GPP RAN Working Group 1 (WG1) has agreed on a preamble based physical structure for the PRACH. RAN WG1 also agreed on the number of available preambles that can be used concurrently to minimize the collision probability between UEs accessing the PRACH in a contention-based manner. These preambles are multiplexed in CDM (code division multiplexing) and the sequences used are Constant Amplitude Zero Auto-Correlation (CAZAC) sequences. All preambles are generated by cyclic shifts of a number of root sequences, which are configurable on a cell-basis.

In the case where the UE is UL synchronized, it uses a contention-free Scheduling Request (SR) channel for the transmission of a scheduling request. As opposed to the former case, the latter case is a contention-free access. In other words, a particular scheduling request channel in a particular transmission instance is allocated to at most one UE. In 3GPP LTE, a two-state scheduling request indicator can be transmitted on a SR channel. In case a UE has a pending SR to transmit, it transmits a positive (or ON) SRI on its next available SR channel. In case a UE does not have a pending SR to transmit, it transmits a negative (or OFF) SRI, or equivalently transmit nothing on its assigned SR channel. A pending (i.e. positive or ON) SRI is triggered by, including but are not limited to, buffer status changes or event-triggered measurement reports. WG1 has agreed that a two-state Scheduling Request Indicator (SRI) be transmitted with On-Off Keying using a structure similar to ACK/NACK transmission.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one-bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. As seen from this example, some elements of the control information should be provided additional protection, when compared with other information. For instance, the ACK/NACK information is typically required to be highly reliable in order to support an appropriate and accurate HARQ operation. This uplink control information is typically transmitted using a physical uplink control channel (PUCCH). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. The Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "3$^{rd}$ Generation Partnership Project; Technical Specification Group Radio Access Network; Evolved Universal Terrestrial Radio Access (E-UTRA); Physical Channels and Modulation (Release 8)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Both the SRI (schedule request indicator) and the SRS (sounding reference signal) allocations are configured semi-statically by the eNB, and occur periodically. The typical period for the SRI is 10 ms so as to provide a low-latency procedure whenever the UE needs to transmit new data. The SRS period typically depends on the type of traffic and the UE velocity. As a result, SRS and SRI periods may not be integer multiple of each other, in which case it may happen that both are occasionally scheduled in the same transmission instance. Disclosed herein are various embodiments of solutions for retaining the SC (single carrier) property of the transmission for a particular allocation in which the SRS and SRI overlap in one transmission instance.

Figure 1:
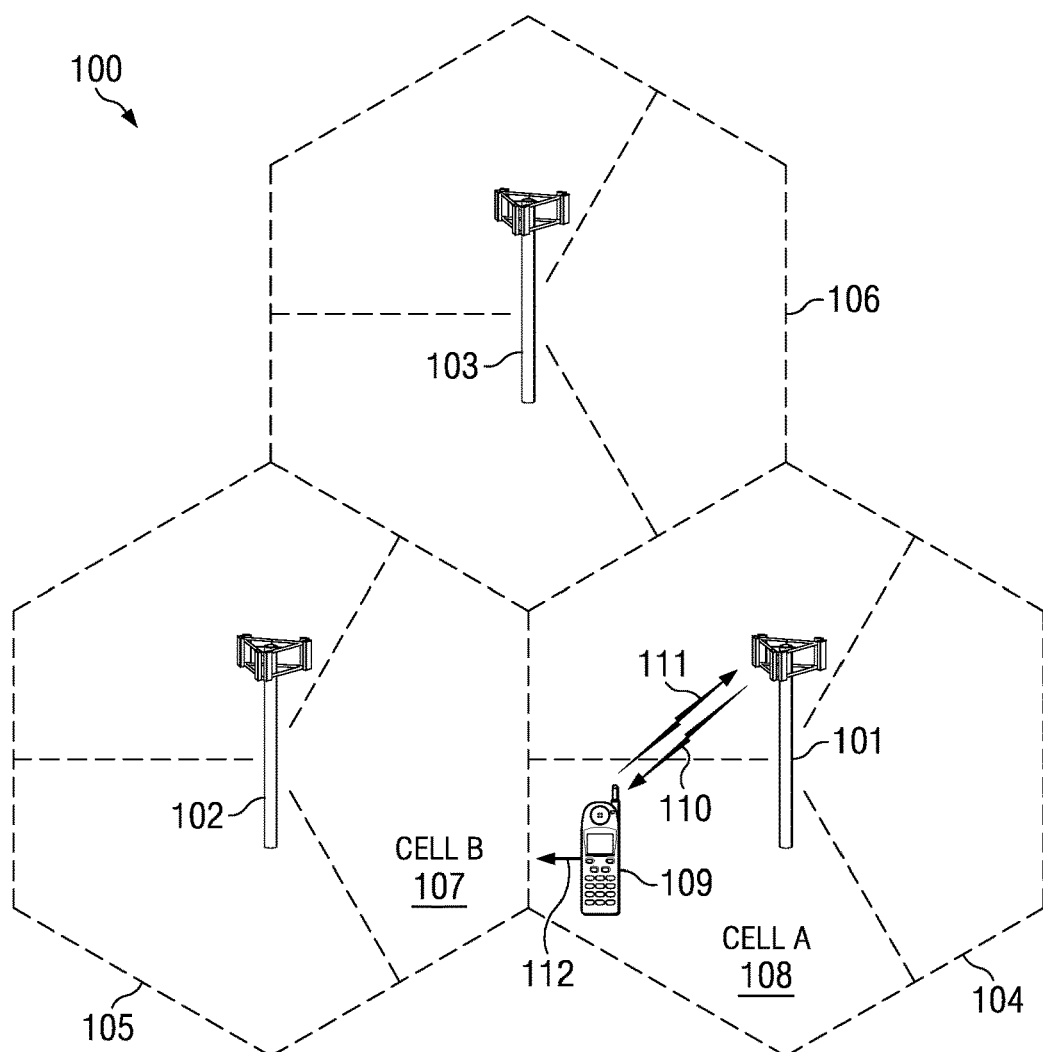
FIG. 1 is a pictorial of an illustrative telecommunications network where SRI and SRS are allocated for transmission in uplink.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station (eNB) 101. Base station 101 is transmitting to and receiving transmissions from UE 109 via downlink 110 and uplink 111. A UE in a cell may be stationary such as within a home or office, or may be moving while a user is walking or riding in a vehicle. UE 109 moves within cell 108 with a velocity 112 relative to base station 101. As UE 109 moves out of Cell A 108, and into Cell B 107, UE 109 may be handed over to base station 102. Because UE 109 is synchronized with base station 101, UE 109 must employ non-synchronized random access to initiate handover to base station 102. As long as UE remains within cell 108 and remains synchronized to nNB 101 it may request allocation of resources using the scheduling request procedure. Occasional conflicts between the semi-static SRS allocations and SRI allocations for UE 109 are resolved using an embodiment as described in more detail below.

Figure 2:
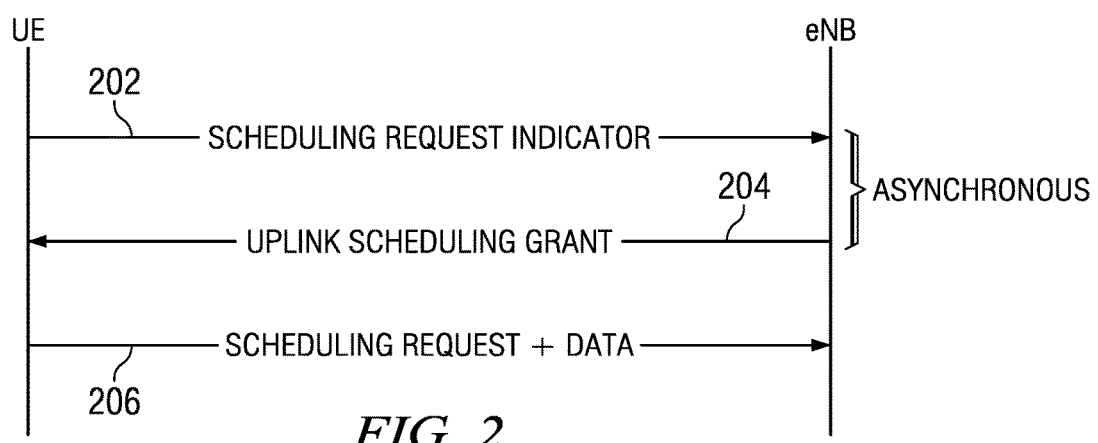
FIG. 2 is a ladder diagram illustrating a Scheduling Request procedure for UL synchronized UEs.

FIG. 2 is a ladder diagram illustrating a scheduling request procedure for UL synchronized UEs. For example, a UE, such as UE 109 in FIG. 1, is semi-statically allocated an SRI channel on a set of periodic transmission instances. When UE 109 determines that it needs to transmit data or information to eNB 101 (i.e. the UE has a pending scheduling request), it first transmits a positive (or ON) SRI 202 at its next assigned SRI transmission opportunity. Here, an SRI transmission opportunity refers to an allocated SRI channel on a transmission instance. The eNB receives SRI 202 and then issues an uplink scheduling grant 204 to UE 108. UE 108 then transmits a scheduling request (SR) 206 along with data defining what resources are required using the just-allocated resource indicated in scheduling grant 204. In the particular case that an SRS is also scheduled for transmission at the exact same transmission instance as SRI 202, then the conflict is resolved as described in more detail below.

Figure 3A:
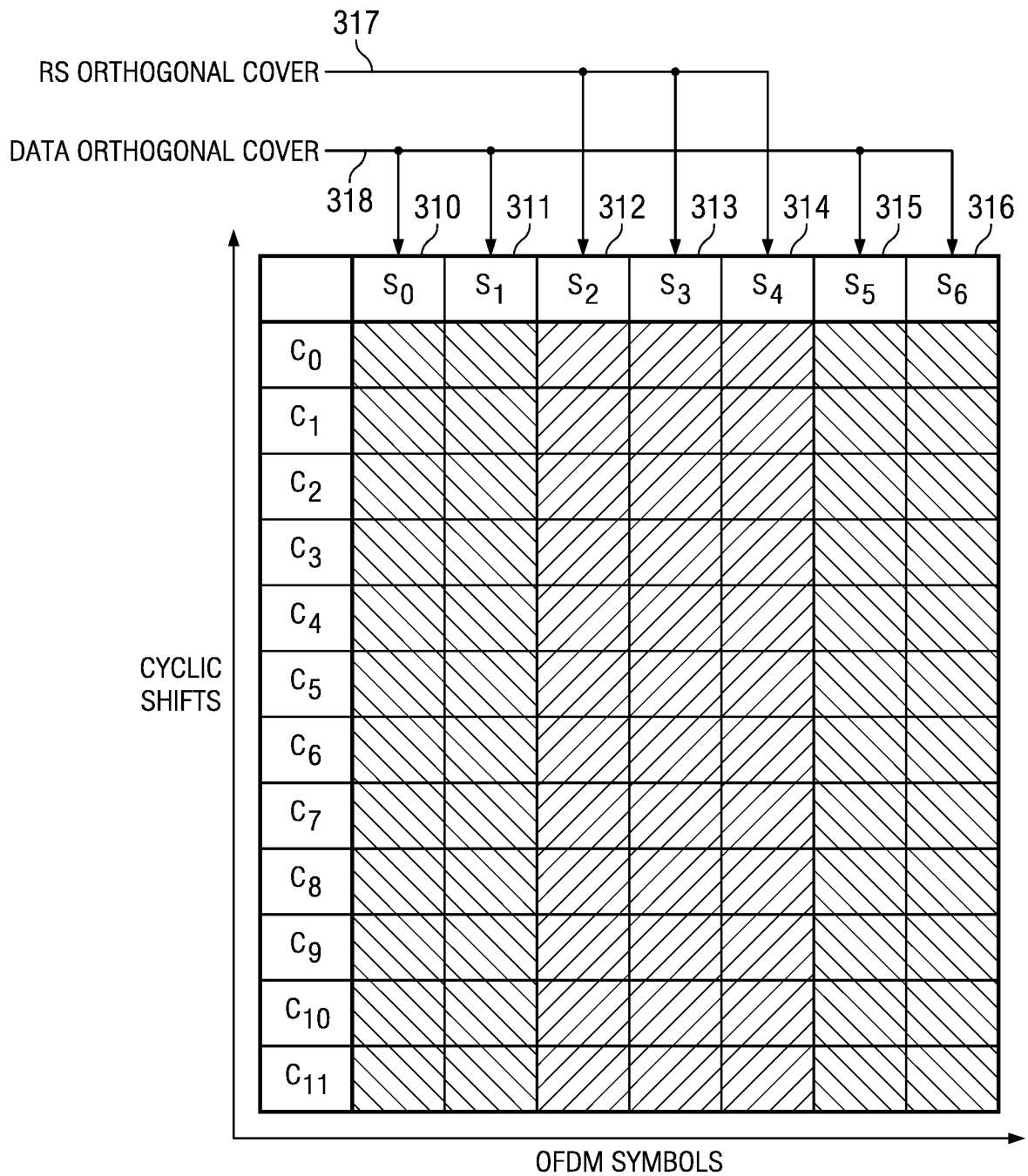
FIGS. 3A and 3B illustrate transmission structures of multiple users within the same frequency and time resource.
Figure 3B:
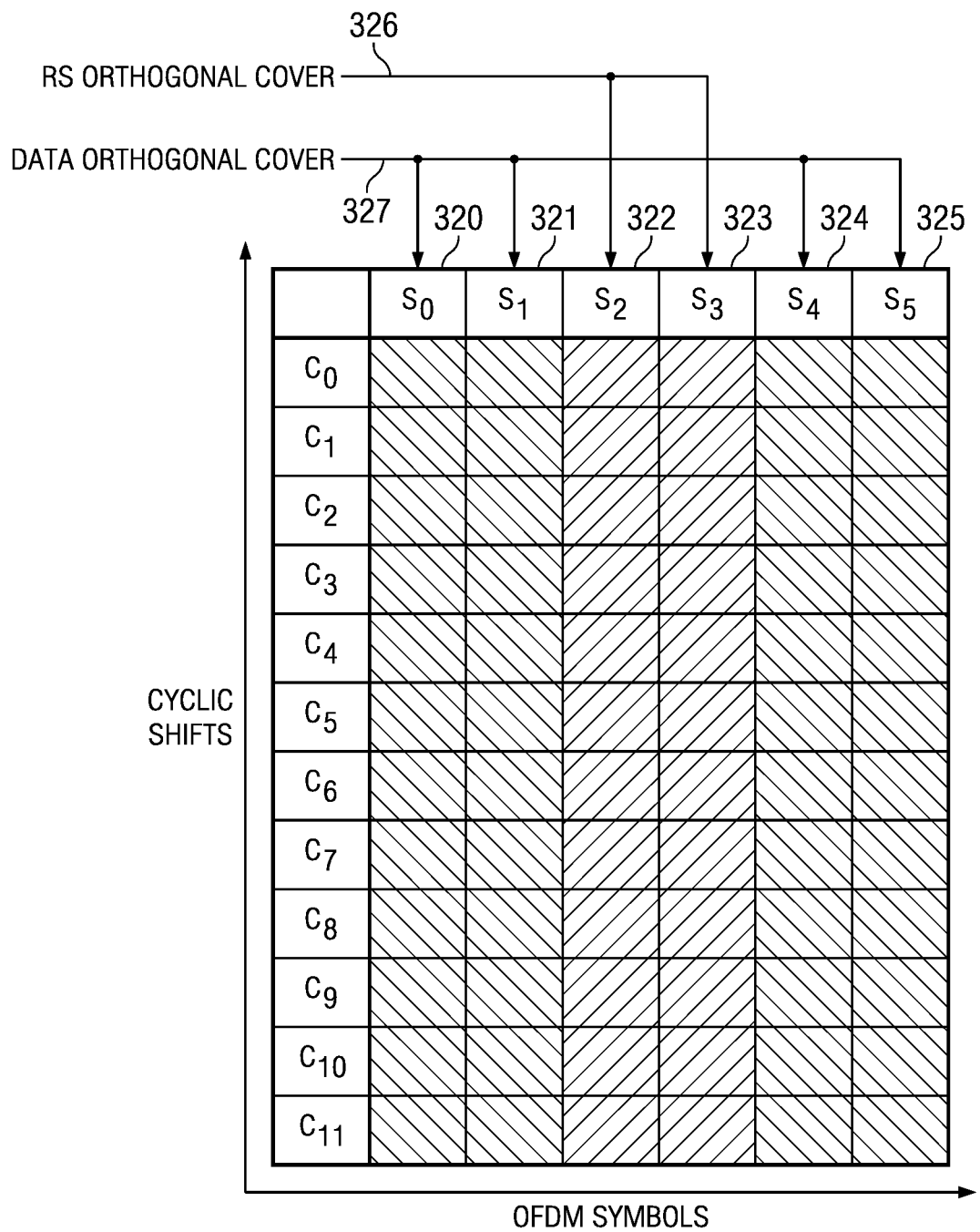

FIGS. 3A and 3B illustrate coherent orthogonal structures that support transmission of SRI by multiple users within the same frequency and time resource. A similar structure is specified in E-UTRA specifications for ACK/NACK transmission on PUCCH. FIG. 3A illustrates one slot of a transmission frame in which normal cyclic prefix (CP) are used, where $c_0$-$c_{11}$ represent the cyclic shifts of a root CAZAC-like sequence, and $s_0$-$s_6$ represent seven OFDM symbols per slot (0.5 ms). Without loss of generality, the middle three OFDM symbols 312-314 carry PUCCH DM RS, while the other four OFDM symbols 310, 311, 315 and 316 carry SRI data information. Orthogonal covering 317 and 318 is applied to the RS OFDM symbols and the data bearing OFDM symbols, respectively. In case a UE has a pending scheduling request and is transmitting a positive (or ON) SRI, then the CAZAC-like sequences in OFDM symbols 310, 311, 315 and 316 are modulated/multiplied by 1. In case a UE does not have a pending scheduling requesting, it does not transmit any signal on its assigned SRI channel, including the RS symbols 312-314 and the data symbols 310, 311, 315 and 316, which is equivalent to transmit a negative (or OFF) SRI.

For the SRI illustrated in FIG. 3A, in each slot of a two slot sub-frame, a seven symbol length sequence is split into two orthogonal sequences, length three and length four, as illustrated. In 3GPP LTE, the defined length-3 orthogonal sequence is the DFT sequences, while the length-4 orthogonal sequence is the Hadamard sequence. A third length-2 orthogonal covering sequence can be applied on to the length-3 and length-4 orthogonal covering sequences, which allows multiplexing up to six UEs per cyclic shift. Using up to six cyclic shifts out of twelve available per 180 KHz frequency resource block (RB) this SRI channel can multiplex 36 UEs per RB and per sub-frame (1 ms).

In another embodiment, C0-C11 represent 12 different amounts of phase ramp applied to a root CAZAC-like sequence. A cyclic shifted sequence is obtained by a cyclic shift operation on the root sequence, which is typically defined in the time domain. Phase ramped sequence is obtained by a phase ramp operation on the root sequences, which is typically defined in the frequency domain. The proposed method in this disclosure applies to both cyclic shifted sequences and phase ramped sequences.

Similarly, FIG. 3B illustrates one slot of a transmission frame in which extended cyclic prefix (CP) are used and therefore only six symbols 320-325 are available per slot (0.5 ms). The middle two OFDM symbols 322-323 carry PUCCH DM RS, while the other four OFDM symbols 320, 321, 324 and 325 carry SRI data information. Orthogonal covering 326 and 327 is applied to the RS OFDM symbols and the data bearing OFDM symbols, respectively. In case a UE has a pending scheduling request and is transmitting a positive (or ON) SRI, then the CAZAC-like sequences in OFDM symbols 320, 321, 324 and 325 are modulated/multiplied by 1. In case a UE does not have a pending scheduling requesting, it does not transmit any signal on its assigned SRI channel, including the RS symbols 322-323 and the data symbols 320, 321, 324 and 325, which is equivalent to transmit a negative (or OFF) SRI.

In 3GPP LTE, similar structures in FIG. 3A and FIG. 3B are used for the transmission of ACK/NAK on PUCCH, for normal and extended CP, respectively. For ACK/NAK transmission, the four data OFDM symbols carry the ACK/NAK BSPK or QPSK symbol. In other words, the CAZAC-like sequence in a data OFDM symbol is modulated/multiplied by the ACK/NAK BPSK or QPSK symbol.

In each OFDM symbol, a cyclically shifted or phase ramped CAZAC-like sequence is transmitted. The CAZAC-like sequence in an PUCCH DM RS OFDM symbol is un-modulated, or equivalently modulated/multiplied by 1. The CAZAC-like sequence in a data OFDM symbol is modulated by the data symbol. In case of a positive SRI transmission, the CAZAC-like sequence in a data OFDM symbol is modulated/multiplied by 1. In this disclosure, a CAZAC-like sequence generally refers to any sequence that has the property of constant amplitude zero auto correlation. Examples of CAZAC-like sequences includes but not limited to, Chu Sequences, Frank-Zadoff Sequences, Zadoff-Chu (ZC) Sequences, Generalized Chirp-Like (GCL) Sequences, or any computer generated CAZAC sequences. One example of a CAZAC-like sequence $\bar{r}_{u,v}(n)$ is given by $$\bar{r}_{u,v}(n) = e^{j\varphi(n)\pi/4}, 0 \le n \le M_{sc}^{RS} - 1$$

where $M_{sc}^{RS}=12$ and $\varphi(n)$ is defined in Table 1.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term.

TABLE 1

| u | $\varphi(0), \ldots, \varphi(11)$ | | | | | | | | | | | |
|---|---|---|---|---|---|---|---|---|---|---|---|---|
| 0  | −1 | 1  | 3  | −3 | 3  | 3  | 1  | 1  | 3  | 1  | −3 | 3  |
| 1  | 1  | 1  | 3  | 3  | 3  | −1 | 1  | −3 | −3 | 1  | −3 | 3  |
| 2  | 1  | 1  | −3 | −3 | −3 | −1 | −3 | −3 | 1  | −3 | 1  | −1 |
| 3  | −1 | 1  | 1  | 1  | 1  | −1 | −3 | −3 | 1  | −3 | 3  | −1 |
| 4  | −1 | 3  | 1  | −1 | 1  | −1 | −3 | −1 | 1  | −1 | 1  | 3  |
| 5  | 1  | −3 | 3  | −1 | −1 | 1  | 1  | −1 | −1 | 3  | −3 | 1  |
| 6  | −1 | 3  | −3 | −3 | −3 | 3  | 1  | −1 | 3  | 3  | −3 | 1  |
| 7  | −3 | −1 | −1 | −1 | 1  | −3 | 3  | −1 | 1  | −3 | 3  | 1  |
| 8  | 1  | −3 | 3  | 1  | −1 | −1 | −1 | 1  | 1  | 3  | −1 | 1  |
| 9  | 1  | −3 | −1 | 3  | 3  | −1 | −3 | 1  | 1  | 1  | 1  | 1  |
| 10 | −1 | 3  | −1 | 1  | 1  | −3 | −3 | −1 | −3 | −3 | 3  | −1 |
| 11 | 3  | 1  | −1 | −1 | 3  | 3  | −3 | 1  | 3  | 1  | 3  | 3  |
| 12 | 1  | −3 | 1  | 1  | −3 | 1  | 1  | 1  | −3 | −3 | −3 | 1  |
| 13 | 3  | 3  | −3 | 3  | −3 | 1  | 1  | 3  | −1 | −3 | 3  | 3  |
| 14 | −3 | 1  | −1 | −3 | −1 | 3  | 1  | 3  | 3  | 3  | −1 | 1  |
| 15 | 3  | −1 | 1  | −3 | −1 | −1 | 1  | 1  | 3  | 1  | −1 | −3 |
| 16 | 1  | 3  | 1  | −1 | 1  | 3  | 3  | 3  | −1 | −1 | 3  | −1 |
| 17 | −3 | 1  | 1  | 3  | −3 | 3  | −3 | −3 | 3  | 1  | 3  | −1 |
| 18 | −3 | 3  | 1  | 1  | −3 | 1  | −3 | −3 | −1 | −1 | 1  | −3 |
| 19 | −1 | 3  | 1  | 3  | 1  | −1 | −1 | 3  | −3 | −1 | −3 | −1 |
| 20 | −1 | −3 | 1  | 1  | 1  | 1  | 3  | 1  | −1 | 1  | −3 | −1 |
| 21 | −1 | 3  | −1 | 1  | −3 | −3 | −3 | −3 | −3 | 1  | −1 | −3 |
| 22 | 1  | 1  | −3 | −3 | −3 | −3 | −1 | 3  | −3 | 1  | −3 | 3  |
| 23 | 1  | 1  | −1 | −3 | −1 | −3 | 1  | −1 | 1  | 3  | −1 | 1  |
| 24 | 1  | 1  | 3  | 1  | 3  | 3  | −1 | 1  | −1 | −3 | −3 | 1  |
| 25 | 1  | −3 | 3  | 3  | 1  | 3  | 3  | 1  | −3 | −1 | −1 | 3  |
| 26 | 1  | 3  | −3 | −3 | 3  | −3 | 1  | −1 | −1 | 3  | −1 | −3 |
| 27 | −3 | −1 | −3 | −1 | −3 | 3  | 1  | −1 | 1  | 3  | −3 | −3 |
| 28 | −1 | 3  | −3 | 3  | −1 | 3  | 3  | −3 | 3  | 3  | −1 | −1 |
| 29 | 3  | −3 | −3 | −1 | −1 | −3 | −1 | 3  | −3 | 3  | 1  | −1 |

Figure 4:
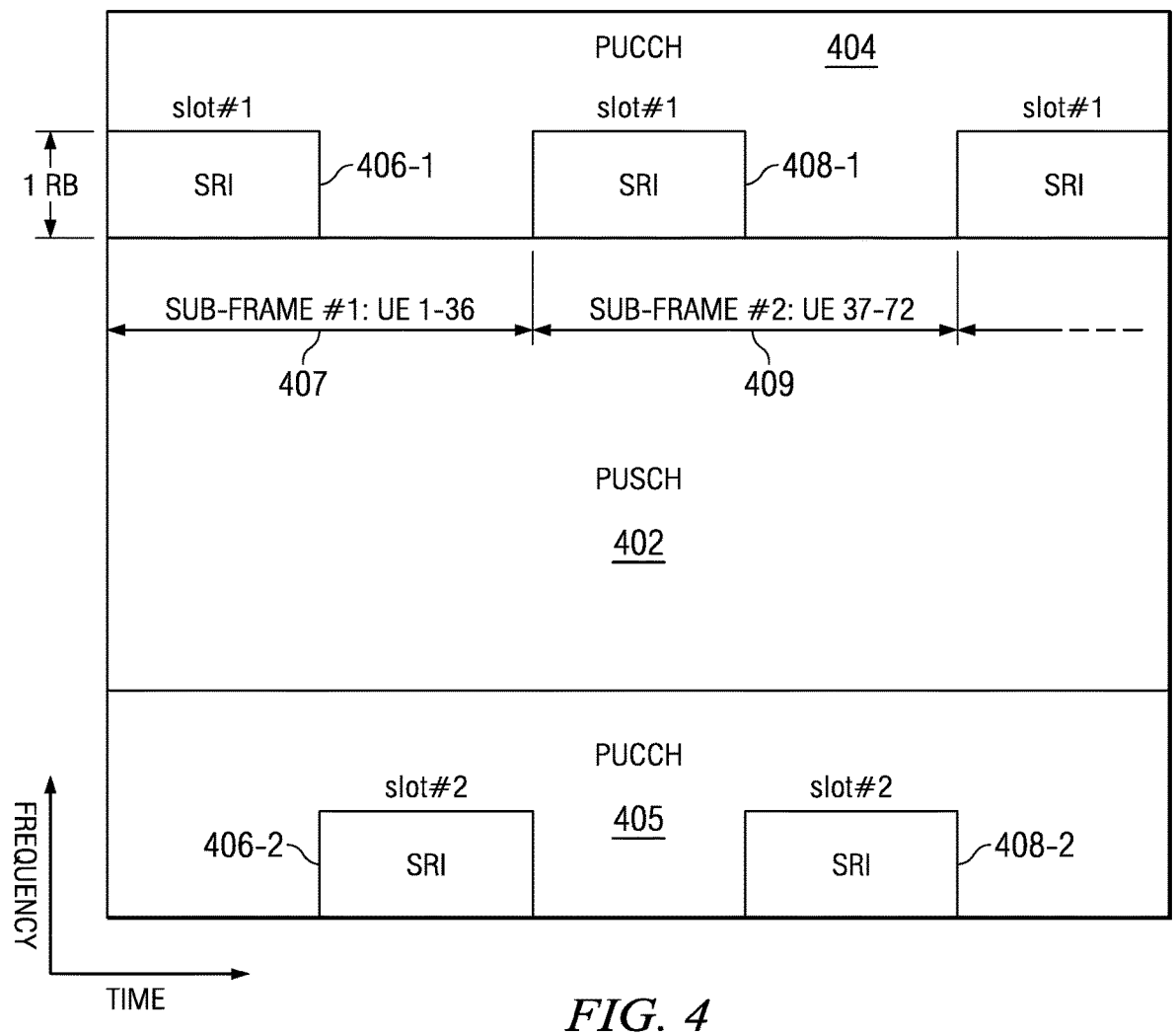
FIG. 4 is a plot illustrating PUCCH and PUSCH, with a Scheduling Request Indicator in PUCCH.

FIG. 4 is frequency vs. time plot illustrating PUCCH 404, 405 and PUSCH 402, with Scheduling Request Indicators transmitted in the PUCCH. In this patent application, without loss of generality, an SRI is sent on the PUCCH. As mentioned earlier, SRI is continuously allocated on one RB of the physical uplink control channel (PUCCH) such that thirty-six UEs can be multiplexed in one RB subframe, as indicated generally at 407. The next sequential subframe is indicated at 408 and can likewise support up to thirty-six UE. Within a sub-frame, the SRI hops at both edges of the system bandwidth on a slot basis. Each slot represents one-half of a subframe. For example, an SRI in slot 406-1 of subframe 407 is in the higher frequency edge 404 and the SRI is repeated in slot 406-2 of subframe 407 which is in the lower frequency edge 405 of the PUCCH. Similarly, slots 408-1, 408-2 carry SRI for the next set of thirty-six UE in subframe 409. In general, the first and second slot SRI sequences are the same, but they may be different in some embodiments.

A Sounding reference signal (SRS) is transmitted in one SC-OFDM symbol within a transmission instance (e.g. a 1 ms subframe consisting of 14 or 12 SC-OFDM symbols). SRS is typically wideband in support of frequency-dependent scheduling, link adaptation, power control, and UL synchronization maintenance, for example.

Unlike "pure" OFDMA systems, Single Carrier (SC) systems are more restrictive regarding how different UL transmissions can be frequency-multiplexed, and can be defined as follows: for a given UE, only one transmission per SC-OFDM symbol can be frequency-mapped to the system bandwidth so that the UE cannot frequency multiplex different transmissions in the same SC-OFDM symbol. This prevents a spike in the peak to average power ratio (PAPR) that is undesirable.

Both SRI and SRS allocations are configured semi-statically by the eNB, and occur periodically. The typical period for the SRI is 10 ms so as to provide a low-latency procedure whenever the UE needs to transmit new data. The SRS period typically depends on the type of traffic and the UE speed. As a result, SRS and SRI periods may not be integer multiple of each other, in which case it may happen that both are configured in the same transmission instance. Several solutions will be described in the following paragraphs.

Solution 1

It is possible that SRS and ACK/NAK (or CQI) may need to be transmitted in the same transmission instance (e.g. a 1 ms subframe). Due to the restriction imposed by the single carrier property, the transmission of ACK/NACK (or CQI) is prioritized over SRS and SRS is always dropped. As a result, one could think at extending the same rule for SRI and SRS. However, in the case of simultaneous SRI and SRS allocation in the same transmission instance, the "SRS dropping" rule does not need to be so restrictive, because the SRI transmission only occurs when a UE actually has a pending scheduling request. In other words, the transmission of SRI is On-Off based, and most of the time, UE does not send anything (i.e. no pending scheduling request). As a result, in order not to unnecessarily drop SRS, the following transmission method is applicable in case of simultaneous SRI and SRS allocation: whenever a UE has both a PUCCH-SRI and an SRS allocation in the same transmission instance, if the UE has a pending scheduling request, it transmits a positive (or ON) SRI and does not transmit SRS; otherwise, it transmits SRS.

Solution 2

Figure 5:
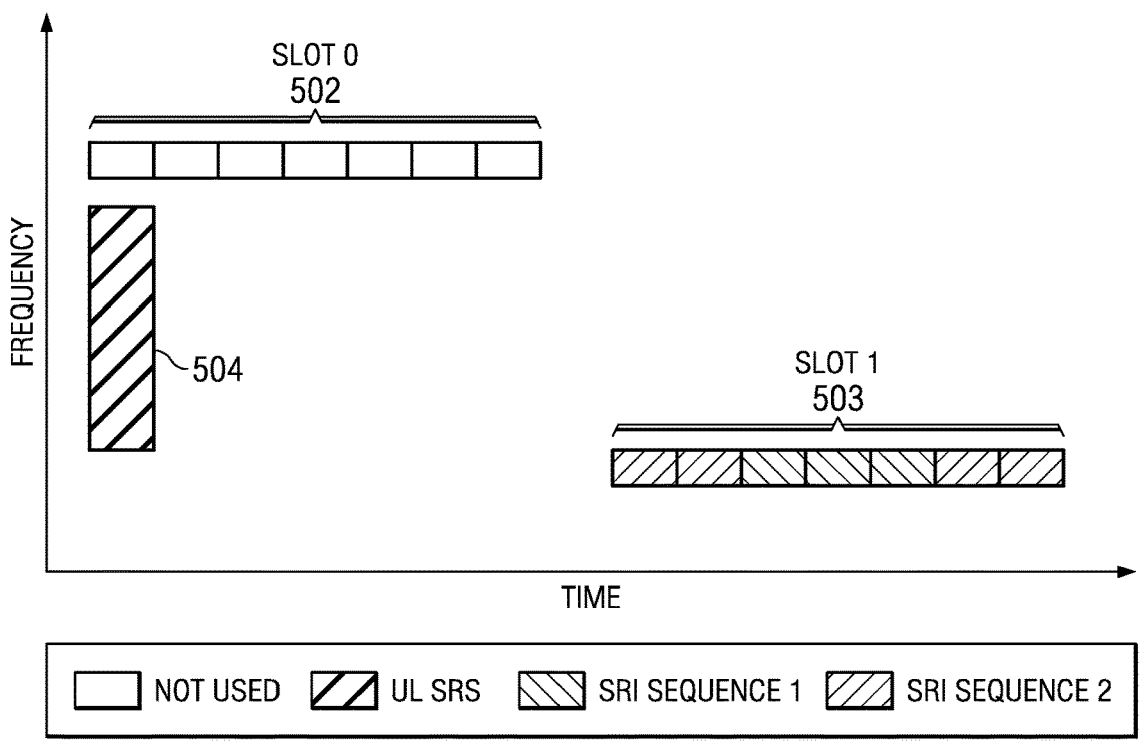
FIG. 5 illustrates an embodiment in which SRS is transmitted in one slot and SRI is transmitted in the other slot.

FIG. 5 is a simplified version of FIG. 4 further illustrating an embodiment of concurrent transmission scheme of SRS and SRI in the same transmission instance. Here, each transmission instance consists of two slots, where SRS is transmitted in one slot 502 and SRI is transmitted in the other slot 503. FIG. 5 shows an example where SRS 504 is transmitted in the first slot 502 on the PUSCH resources and SRI is transmitted in the second slot 503 on the PUCCH resource. The resource for SRI in the first slot of the PUCCH can be left unused. It is not precluded that UL SRS is transmitted in the second slot and SRI is transmitted in the first slot. The position of SRS in FIG. 5 is exemplary.

Solution 3

A third approach is to puncture one SRI symbol within the transmission instance (comprising a plurality of symbols) to accommodate the transmission of SRS. FIGS. 6A-6E show a few examples where the first SRI symbol is punctured for SRS. The position of SRS is exemplary. The SRS may be placed in the last OFDM symbol of a subframe, for example.

Figure 6A:
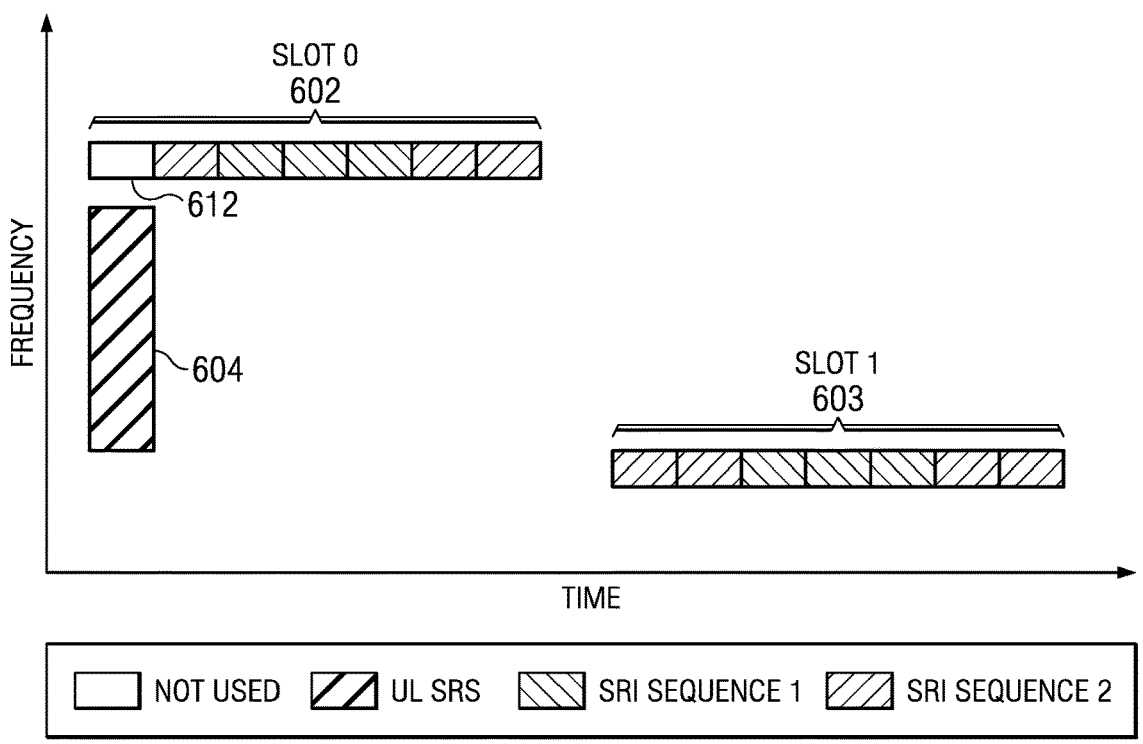
FIGS. 6A-6E illustrate various embodiments of puncturing one SRI Symbol for the transmission of SRS.

In FIG. 6A, SRS 604 is transmitted in the first OFDM symbol 612 in slot 0 602. Note that SRI is not transmitted in symbol 612, thereby maintaining the single carrier property. The punctured slot 0 SRI contains only six symbols, while the SRI in slot 1 603 contains the normal seven symbols.

It should be noted that when any of the examples of the third solution are used, all UEs in the cell should transmit the SRI with the punctured format, even when SRS is not being transmitted.

Figure 6B:
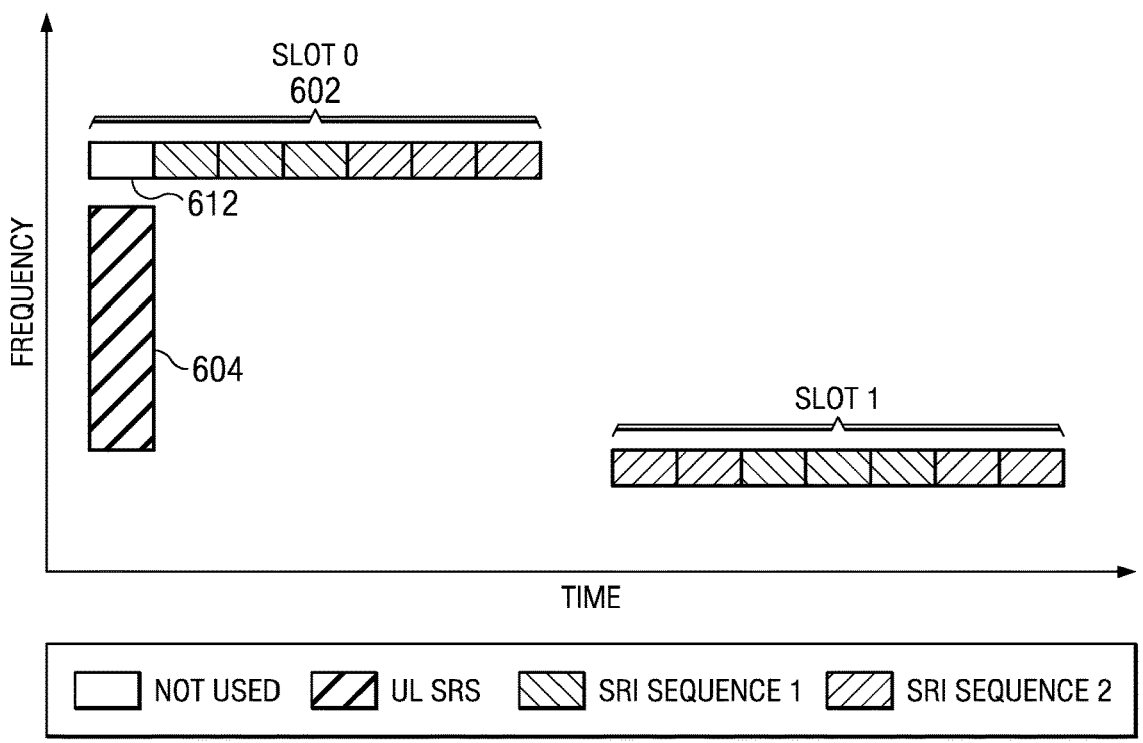

FIG. 6B illustrates a punctured SRI in which the first three symbols ($S_1$, $S_2$, $S_3$) after empty symbol $s_0$ 612 contain the first SRI sequence and the last three symbols ($S_4$, $S_5$, $S_6$) of slot 0 contain the second SRI sequence. The slot 1 SRI contains the standard SRI with the first sequence in the middle three symbols and the second sequence in the four remaining outer symbols. Each of the OFDM symbols denoted by the first SRI sequence can be used for the transmission of SRI DM RS, while each of the OFDM symbols denoted by the second SRI sequence can be used for the transmission of SRI data.

Figure 6C:
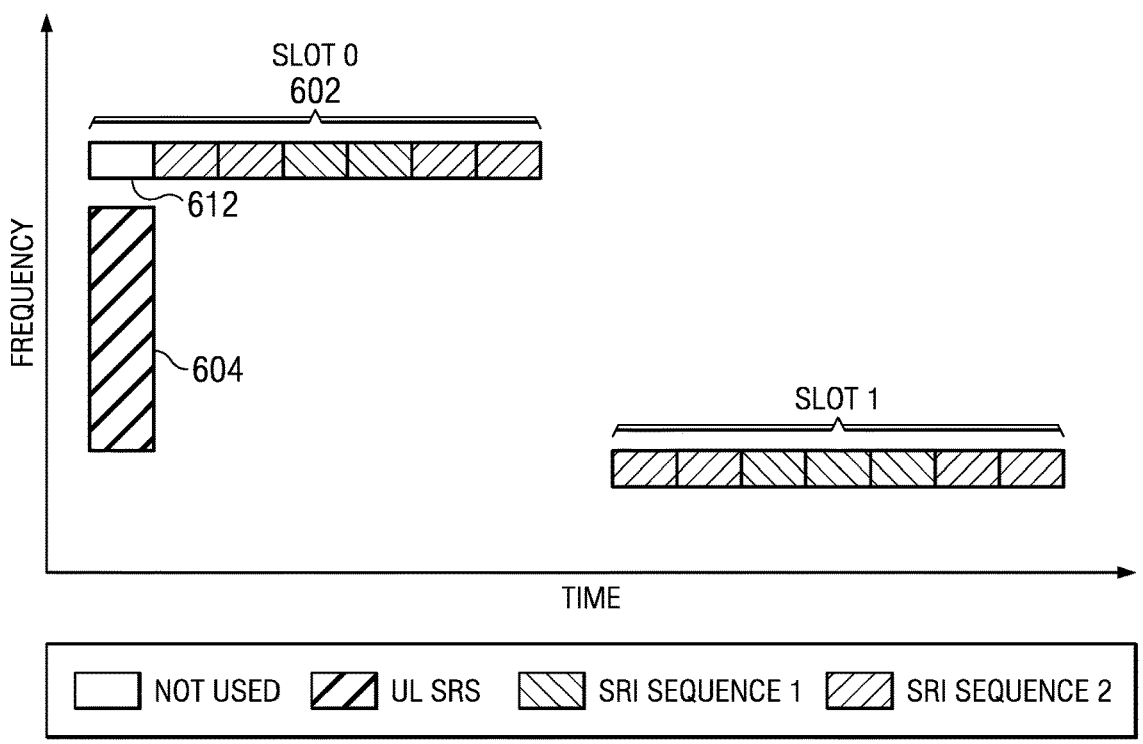

FIG. 6C illustrates a punctured SRI in which the first SRI sequence in slot 0 occupies only two symbols ($S_3$, $S_4$) and the second SRI sequence in slot 0 occupies the four remaining symbols ($S_1$, $S_2$, $S_5$, $S_6$). The slot 1 SRI contains the standard SRI with the first sequence in the middle three symbols and the second sequence in the four remaining outer symbols. Each of the OFDM symbols denoted by the first SRI sequence can be used for the transmission of SRI DM RS, while each of the OFDM symbols denoted by the second SRI sequence can be used for the transmission of SRI data.

Figure 6D:
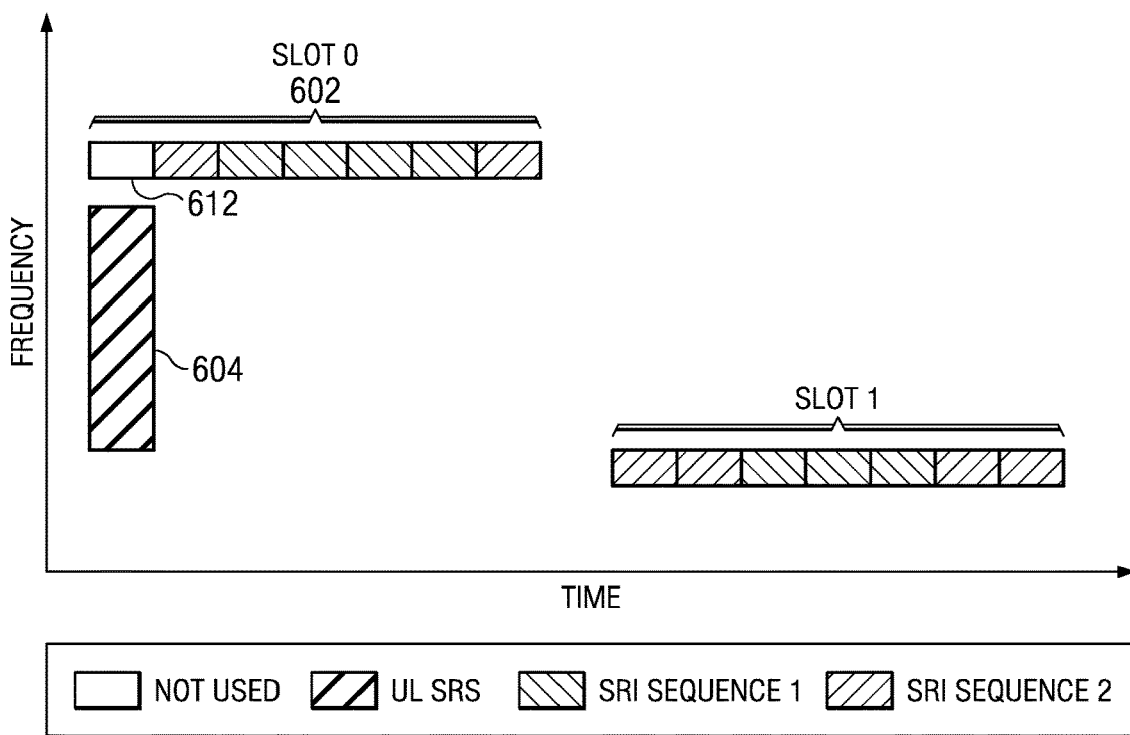

FIG. 6D illustrates a punctured SRI in which the first SRI sequence in slot 0 occupies four symbols ($S_2$, $S_3$, $S_4$, $S_5$) and the second SRI sequence in slot 0 occupies the two remaining symbols ($S_1$, $S_6$). The slot 1 SRI contains the standard SRI with the first sequence in the middle three symbols and the second sequence in the four remaining outer symbols. Each of the OFDM symbols denoted by the first SRI sequence can be used for the transmission of SRI DM RS, while each of the OFDM symbols denoted by the second SRI sequence can be used for the transmission of SRI data.

Figure 6E:
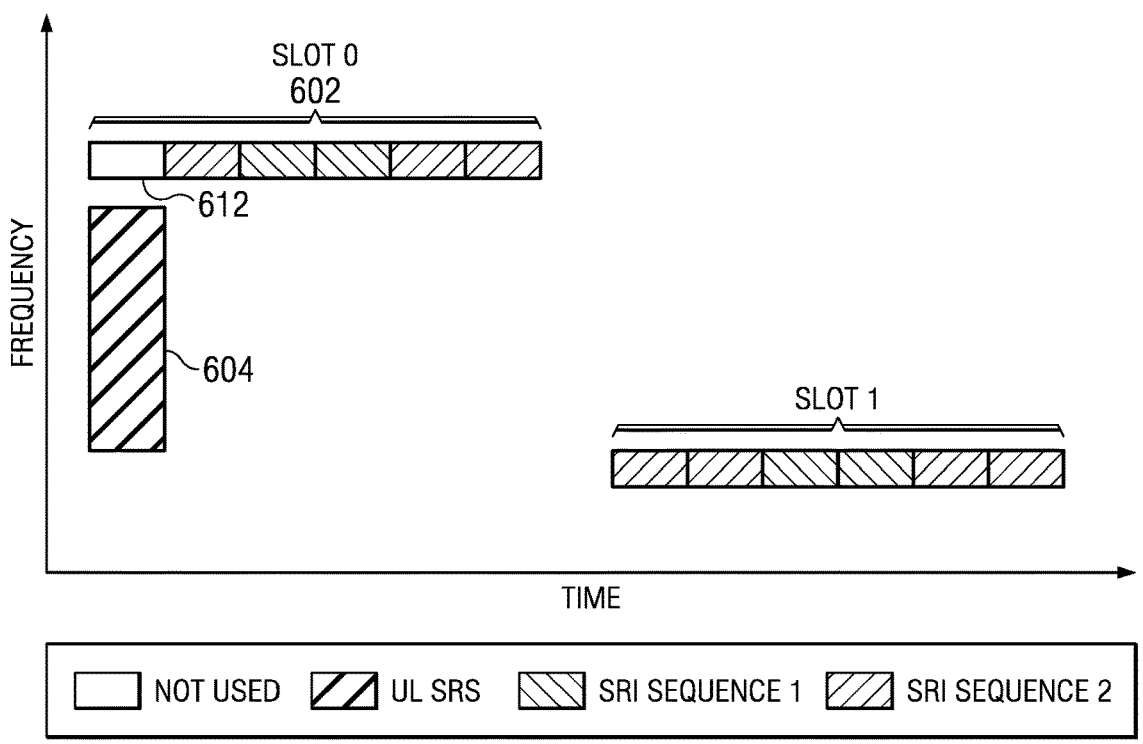

FIG. 6E illustrates a punctured SRI based on the extended CP format of FIG. 3B in which the first SRI sequence in slot 0 occupies two symbols ($S_2$, $S_3$) and the second SRI sequence in slot 0 occupies the three remaining symbols ($S_1$, $S_4$, $S_5$). The slot 1 SRI contains the standard SRI with the first sequence in the middle two symbols of the extended CP format and the second sequence in the four remaining outer symbols. Each of the OFDM symbols denoted by the first SRI sequence can be used for the transmission of SRI DM RS, while each of the OFDM symbols denoted by the second SRI sequence can be used for the transmission of SRI data.

In other embodiments, the format of the SRI in slot 1 may also be varied to more closely match the punctured SRI in slot 0.

Configuration of SRS+SRI Operation

Overall, solution 1 and solution 3 appear to be the reasonable methods for handling concurrent allocation/transmission of SRS and SRI in the same transmission instance. Therefore, the following two Options may apply.

Option 1: Drop SRS in case UE needs to transmit a positive (or ON) SRI as described in solution 1.

Option 2: Puncture one SRI symbol to allow simultaneous SRS and SRI transmission in one transmission instance as described in solution 3.

It is possible for Node-Bs or cells to configure the SRS+SRI operation. For example, a 1-bit control signaling can be included in a broadcast channel (for example, dynamic BCH) to indicate whether Option 1 or Option 2 is adopted for a given cell. This configuration can be cell specific, NodeB specific or common to all cells/NodeBs in the system.

Similarly, for SRS+ACK/NAK, two options are available:
Option 1: Drop SRS in case of collision with ACK/NAK
Option 2: Puncture one ACK/NAK symbol to allow simultaneous SRS and ACK/NAK transmission.

Thus, two control signaling bits can be included in D-BCH, one for the configuration of SRS+SRI, and the other for the configuration of SRS+ACK/NAK. Alternatively, it is not precluded that a common 1-bit control signaling bit is used to configure the operations of both SRS+SRI and SRS+ACK/NAK. For example, the 1-bit control signaling indicates:

Drop SRS in case of collision with a positive SRI or ACK/NAK, or

Puncture one SRI or ACK/NAK symbol to allow simultaneous SRS and SRI or SRS and ACK/NAK transmission.

Using a common 1-bit signaling for the configurations of concurrent allocation/transmission of SRS+SRI and SRS+ACK/NAK is preferable, due to less control overhead.

Figure 7:
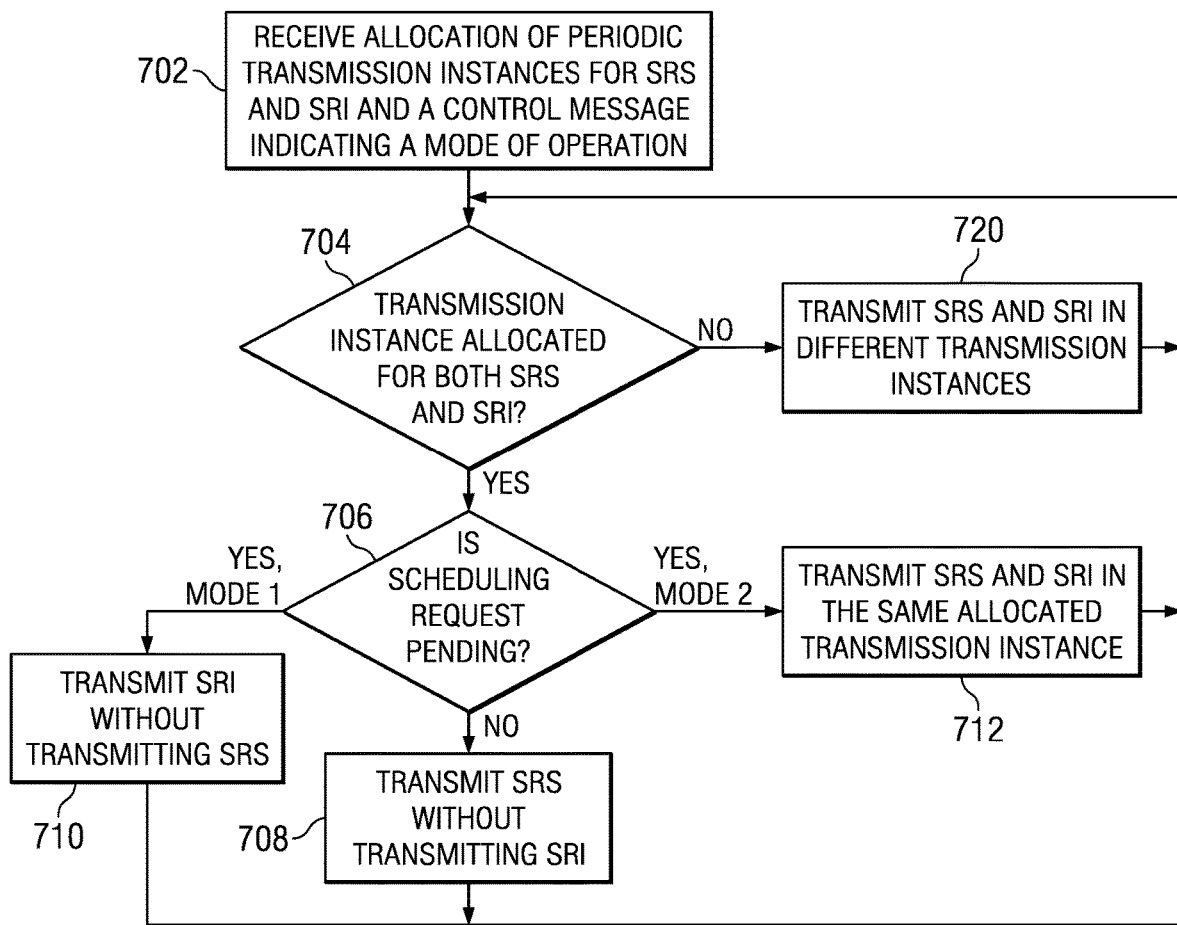
FIG. 7 is a flow diagram illustrating allocation and transmission of SRS and SRI according to an embodiment of the present invention.

FIG. 7 is a flow diagram illustrating allocation and transmission of SRS and SRI according to an embodiment of the present invention. As described above, orthogonal block spreading codes can be applied to multiple users for simultaneous transmission within the same frequency—time resource. This scheme is used for transmission of SRI. When a UE enters a cell, it receives 702 from the NodeB serving the cell an allocation of a set of periodic transmission instances for SRI. It also receives 702 an allocation of a set of periodic transmission instances for SRS. It also receives configuration information to instruct it as to which channel resources it is to use for transmission. In some embodiments, it also receives an indication of a mode of operation to use when an SRS transmission and an SRI transmission are both allocated in the same transmission instance.

During a normal course of operation, a given UE transmits 720 an SRS according to its periodic SRS allocation. Whenever it has a scheduling request to transmit, it sends 720 a positive (or ON) SRI according to its periodic SRI allocation and receives further resource allocations using the three step procedure described with respect to FIG. 2.

Generally, a particular SRS allocation and a particular SRI allocation will be allocated different transmission instances. Since the SRI and SRS allocations have different periods, occasionally a same transmission instance will be allocated 704 for both SRS and SRI. Frequently, when this happens, there will not be any scheduling request 706 for transmission so there will not be a pending SRI. Hence, the SRS is transmitted 708 without transmitting an SRI in a transmission instance allocated for both SRI and SRS when the SRI indicates no pending scheduling request.

In a small percentage of occurrences, there is a pending scheduling request and consequently an SRI will therefore be pending 706 for transmission. In this case, if the UE has been instructed to use a first mode of operation when a transmission instance is allocated for both SRS and SRI, the SRI is transmitted 710 without transmitting the SRS in the transmission instance. In a second mode of operation, both the SRI and the SRS are transmitted 712 in the transmission instance. In various embodiments, this is accomplished using one of the structures described in more detail in FIGS. 6A-6E where a transmission instance comprises of a plurality of SC-OFDMA symbols. In the second mode of operation, at least one SC-OFDMA symbol is used for the transmission of SRS and at least another SC-OFDMA symbol is used for the transmission of SRI.

For embodiments in which a control message 702 indicating a mode of operation is not used, then the UE will follow a default procedure. The default may be to transmit 710 an SRI without transmitting an SRS in a transmission instance allocated for both SRI and SRS when the SRI indicates a pending scheduling request, and transmit 708 an SRS without transmitting an SRI in a transmission instance allocated for both SRI and SRS when the SRI indicates no pending scheduling request.

The control message indicating a mode of operation is sent 702 to all user equipments within a cell of the wireless network. The mode of operation is common to all user equipments within a cell of the wireless network.

In some embodiments, the control message 702 further indicates a mode of operation in a transmission instance allocated for both ACK/NAK and SRS, wherein in a third mode of operation, the ACK/NAK is transmitted without transmitting the SRS in the transmission instance; and in a fourth mode of operation, both the ACK/NAK and the SRS are transmitted in the transmission instance. In various embodiments, this is accomplished using one of the structures described in more detail in FIGS. 6A-6E for a transmission instance containing a plurality of SC-OFDMA symbols. In the fourth mode of operation, at least one SC-OFDMA symbol is used for the transmission of SRS and at least another SC-OFDMA symbol is used for the transmission of ACK/NAK.

In some embodiments, the control message 702 is binary, indicating either the first and third mode of operations, or the second and fourth mode of operations.

Figure 8A:
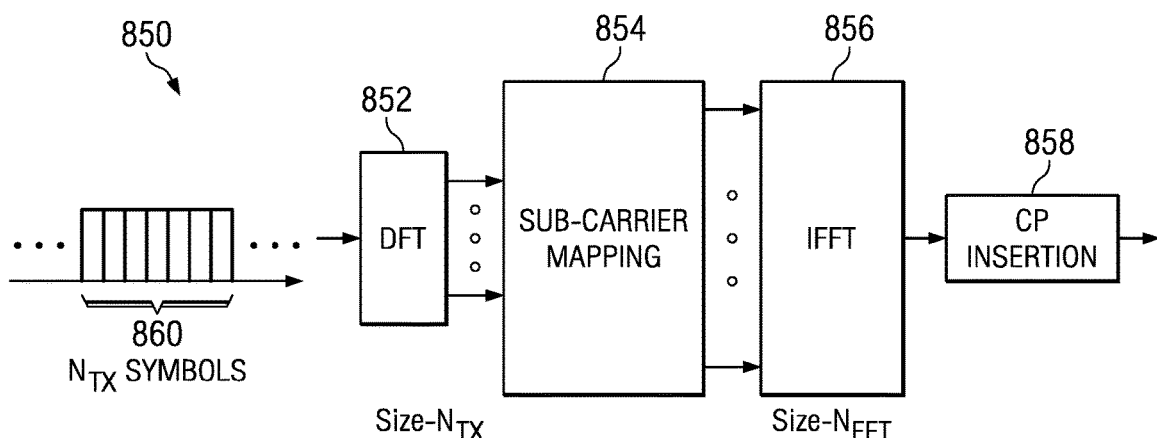
FIG. 8A is a block diagram of a transmitter structure for transmitting the coherent structures of FIGS. 3A-6E.

FIG. 8A is a block diagram of a transmitter structure 850 for transmitting the coherent structures of FIGS. 3A-6E. Elements of transmitter 850 may be implemented as components in a fixed or programmable processor. In some embodiments, the inverse Fast Fourier Transform (IFFT) block in 856 may be implemented using an Inverse Discrete Fourier Transform (IDFT). Similarly, Discrete Fourier Transform (DFT) 852 may be implemented as a Fast Fourier Transform.

The SRI and SRS sequences 860 are transformed to the frequency domain using DFT 852 and mapped onto a designated set of tones (sub-carriers) using Tone Map 854. Additional signals or zero-padding may or may not be present. The UE next performs IFFT of the mapped signal using the IFFT 856 to transform the OFDM signal back to the time domain. The CP is then formed using a portion of the OFDM signal output from IFFT 856 and appended to the OFDM signal to form the complete SC-OFDM symbol which is output to the transmitter (not shown). Formation of the SC-OFDM symbol is controlled as described above so that both an SRS and an SRI are not formed in the same symbol.

In other embodiments, the order of DFT 852, tone map 854 and IFFT 856 may be arranged in various combinations. For example, in one embodiment a DFT operation is performed on a selected root sequence, tone mapping is then performed, an IDFT is performed on the mapped tones and then a cyclic shift may be performed. In another embodiment, tone mapping is performed on the root sequence and then an IDFT is performed on the mapped tones and then a cyclic shift is performed.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term.

Figure 8B:
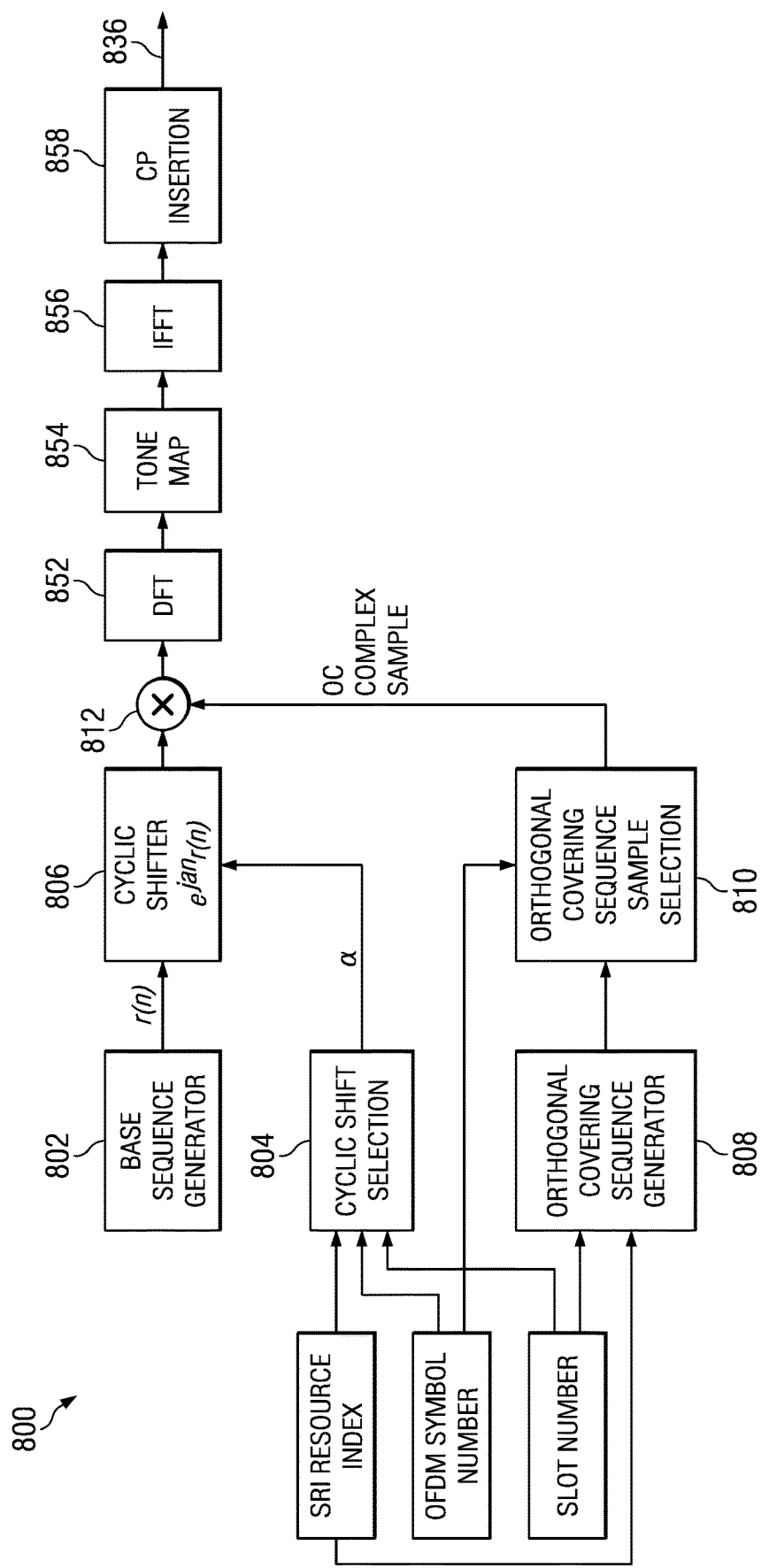
FIG. 8B is a more detailed block diagram of the illustrative transmitter of FIG. 8A.

FIG. 8B is a more detailed block diagram of the illustrative transmitter of FIG. 8A. Elements of the transmitter may be implemented as components in a fixed or programmable processor by executing instructions stored in memory. A pre-defined set of sequences is defined. The UE generates a CAZAC-like (e.g. ZC or extended ZC or zero-autocorrelation QPSK computer-generated) sequence using base sequence generator 802. A cyclic shift value is selected for each symbol based on the SRI resource index, the OFDM symbol number and the slot number in cyclic shift selecting module 804. The base sequence is then shifted by cyclic shifter 806 on a symbol by symbol basis using shift values provided by cyclic shift selection module 804.

The UE generates both orthogonal covering sequences 317 and 318, for example, using orthogonal sequence generator 808. Orthogonal sequence generator 808 generates one sequence out of the set of orthogonal sequences based on the SRI resource index. The orthogonal covering sequence sample selection 810 selects and issues the appropriate sequence sample from the covering sequence based on the index of the OFDM symbol being currently generated. The cyclic shifted base sequence vector is element-wise complex-multiplied by the selected orthogonal covering complex sample in complex multiplier 812. The result of the element-wise complex multiplication is processed as described above to form a final fully formed SC-OFDM uplink signal 836.

SYSTEM EXAMPLES

Figure 9:
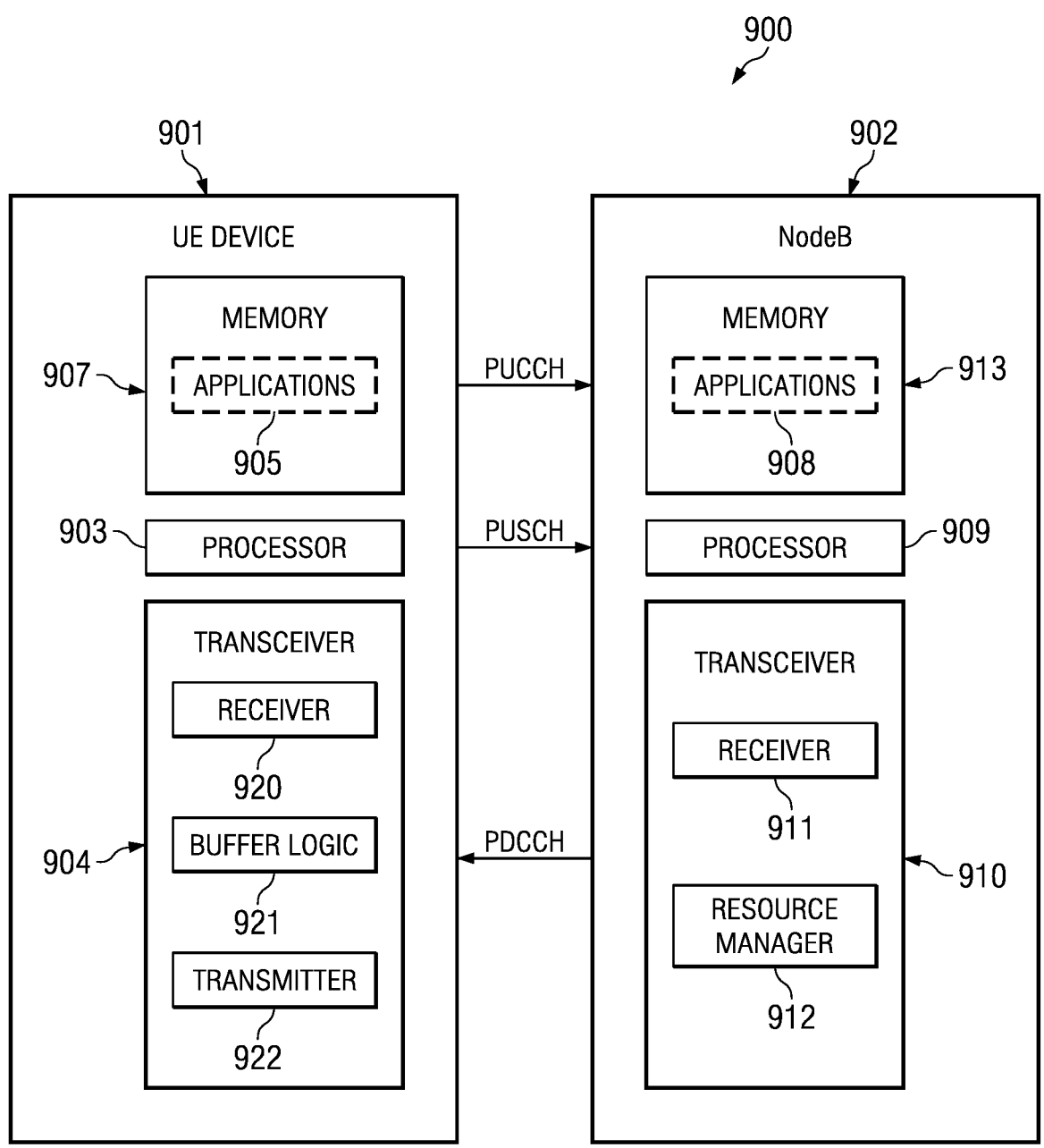
FIG. 9 is a block diagram of a Node B and a User Equipment for use in the network system of FIG. 1.

FIG. 9 is a block diagram illustrating operation of an eNB and a mobile UE in the network system of FIG. 1. As shown in FIG. 9, wireless networking system 900 comprises a mobile UE device 901 in communication with an eNB 902. The mobile UE device 901 may represent any of a variety of devices such as a server, a desktop computer, a laptop computer, a cellular phone, a Personal Digital Assistant (PDA), a smart phone or other electronic devices. In some embodiments, the electronic mobile UE device 901 communicates with the eNB 902 based on a LTE or E-UTRAN protocol. Alternatively, another communication protocol now known or later developed can be used.

As shown, the mobile UE device 901 comprises a processor 903 coupled to a memory 907 and a Transceiver 904. The memory 907 stores (software) applications 905 for execution by the processor 903. The applications 905 could comprise any known or future application useful for individuals or organizations. As an example, such applications 905 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 905, at least some of the applications 905 may direct the mobile UE device 901 to transmit UL signals to the eNB (base-station) 902 periodically or continuously via the transceiver 904. In at least some embodiments, the mobile UE device 901 identifies a Quality of Service (QOS) requirement when requesting an uplink resource from the eNB 902. In some cases, the QoS requirement may be implicitly derived by the eNB 902 from the type of traffic supported by the mobile UE device 901. As an example, VOIP and gaming applications often involve low-latency uplink (UL) transmissions while High Throughput (HTP)/Hypertext Transmission Protocol (HTTP) traffic can involve high-latency uplink transmissions.

As shown in FIG. 9, the transceiver 904 comprises uplink logic. The uplink logic executes instructions that control the operation of the transceiver. Some of these instructions may be stored in memory 907 and executed when needed. As would be understood by one of skill in the art, the components of the Uplink Logic may involve the physical (PHY) layer and/or the Media Access Control (MAC) layer of the transceiver 904. Transceiver 904 includes one or more receivers and one or more transmitters. The transmitter(s) may be embodied as described with respect to FIGS. 8A, 8B for transmission of SC-OFDM SRI and SRS symbols. In particular, as described above, formation of the SRI+SRS SC-OFDM symbols is controlled so that both an SRS and an SRI are not formed in the same symbol. Buffer logic 921 coupled to transmitter 922 stores any pending scheduling request. Receiver 920 is operable to receive and store in memory 907 an allocation comprising a plurality of periodic transmission instances for a scheduling request indicator (SRI) and an allocation comprising a plurality of periodic transmission instances for a sounding reference signal (SRS). Buffer logic 921 is controlled by processor 903 and is operable to store a pending scheduling request. Transmitter 922 is responsive to the buffer logic and is operable to produce and transmit an SRI without transmitting an SRS in a transmission instance allocated for both SRI and SRS when the buffer logic indicates the pending scheduling request. It is operable to transmit an SRS without transmitting an SRI in a transmission instance allocated for both SRI and SRS, when the buffer logic indicates no pending scheduling request.

In some embodiments, receiver 920 is further operable to receive and store in memory 907 a control message from NodeB 902 indicating a mode of operation in a transmission instance allocated for both SRI and SRS with a pending scheduling request in the transmission instance. In a first mode of operation, the transmitter is operable to transmit the SRI without transmitting the SRS in the transmission instance, wherein in a second mode of operation, both the SRI and the SRS are transmitted in the transmission instance using a structure such as illustrated in FIGS. 6A-6E.

On some embodiments, the control message further indicates a mode of operation in a transmission instance allocated for both ACK/NAK and SRS. In a third mode of operation, the transmitter logic is further operable to produce and transmit an ACK/NAK without transmitting the SRS in the transmission instance, wherein in a fourth mode of operation, both the ACK/NAK and the SRS are transmitted in the transmission instance using a structure similar to that illustrated in FIGS. 6A-6E.

In some embodiments, the control message is binary, indicating either the first and third mode of operations, or the second and fourth mode of operations.

As shown in FIG. 9, the eNB 902 comprises a Processor 909 coupled to a memory 913 and a transceiver 910. The memory 913 stores applications 908 for execution by the processor 909. The applications 908 could comprise any known or future application useful for managing wireless communications. At least some of the applications 908 may direct the base-station to manage transmissions to or from the user device 901.

Transceiver 910 comprises an uplink Resource Manager 912, which enables the eNB 902 to selectively allocate uplink PUSCH resources to the user device 901. As would be understood by one of skill in the art, the components of the uplink resource manager 912 may involve the physical (PHY) layer and/or the Media Access Control (MAC) layer of the transceiver 910. Transceiver 910 includes a Receiver 911 for receiving transmissions from various UE within range of the eNB.

Uplink resource manager 912 executes instructions that control the operation of transceiver 910. Some of these instructions may be located in memory 913 and executed when needed. Resource manager 912 controls the transmission resources allocated to each UE that is being served by eNB 902 and broadcasts control information via the physical downlink control channel PDCCH. In particular, for the transmission of SRS and SRI, eNB 902 allocates in a semi-static manner periodic allocations for SRS and SRI and also indicates which mode of operation is to be used to resolve overlap conflicts, as described in more detail above.

Figure 10:
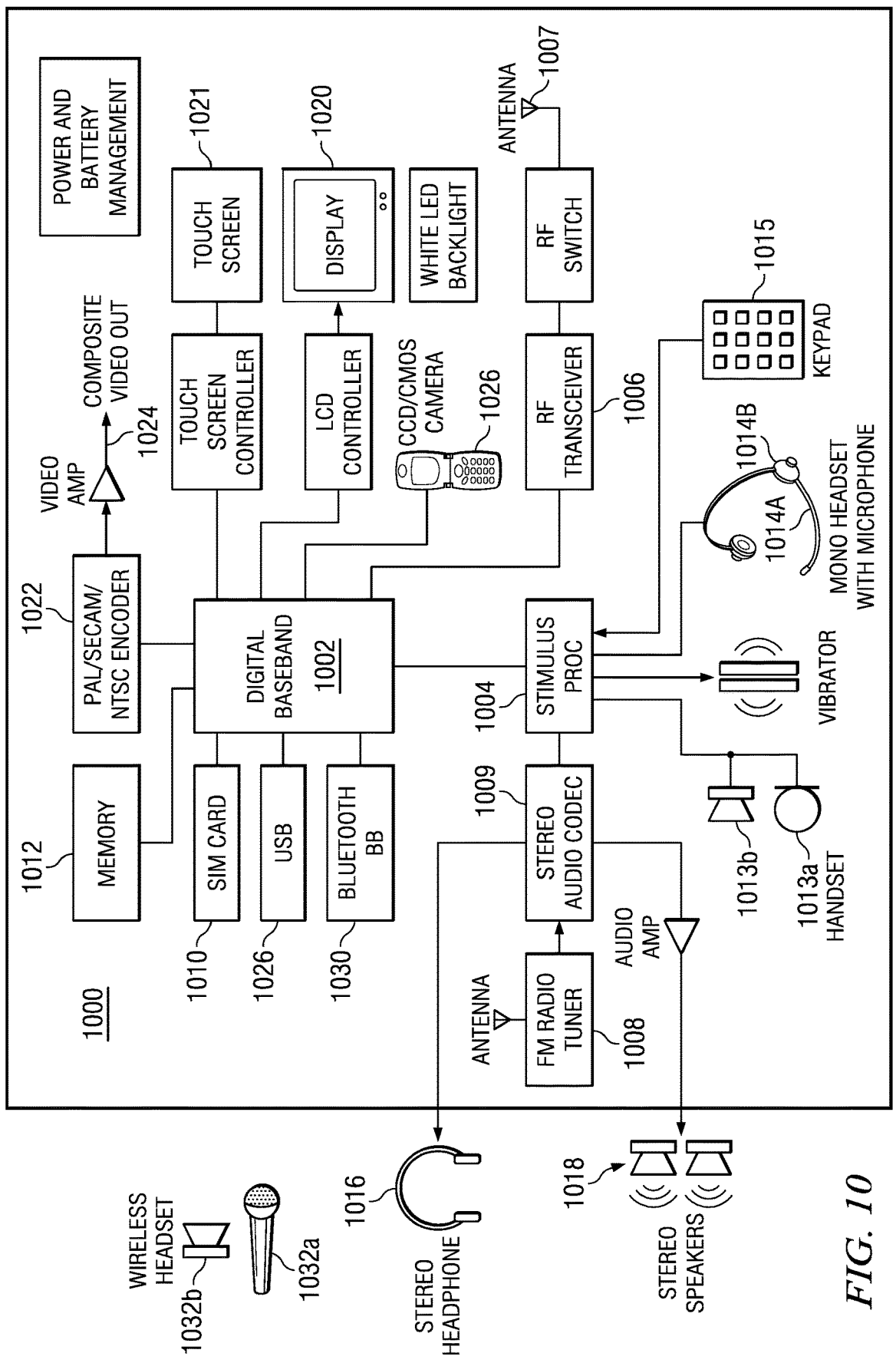
FIG. 10 is a block diagram of a cellular phone for use in the network of FIG. 1.

FIG. 10 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. Transmission of the PUSCH data is performed by the transceiver using the PUSCH resources designated by the serving eNB. In some embodiments, frequency hopping may be implied by using two or more bands as commanded by the serving eNB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unite 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

For SRS and SRI transmission, a transmitter(s) within transceiver 1006 may be embodied as described with respect to FIG. 8A/8B. In particular, as described above, formation of the SRI+SRS SC-OFDM symbols is controlled so that both an SRS and an SRI are not formed in the same symbol. However, in some embodiments, a receiver in transceiver 1006 is operable to receive and store in memory a control message from a NodeB indicating a mode of operation in a transmission instance allocated for both SRI and SRS with a pending scheduling request in the transmission instance. In a first mode of operation, the transmitter is operable to transmit the SRI without transmitting the SRS in the transmission instance, wherein in a second mode of operation, both the SRI and the SRS are transmitted in the transmission instance using a structure such as illustrated in FIGS. 6A-6E.

In 3GPP LTE UL, a similar structure is defined for the transmission of scheduling request indicator (SRI) and ACK/NAK. The difference between the transmission of ACK/NAK and SRI is that ACK/NAK is BPSK/QPSK modulated, depending on the number of ACK/NAK bits, while SRI is ON-OFF keying modulated.

On some embodiments, the control message further indicates a mode of operation in a transmission instance allocated for both ACK/NAK and SRS. In a third mode of operation, the transmitter logic is further operable to produce and transmit an ACK/NAK without transmitting the SRS in the transmission instance, wherein in a fourth mode of operation, both the ACK/NAK and the SRS are transmitted in the transmission instance using a structure similar to that illustrated in FIGS. 6A-6E.

In some embodiments, the control message is binary, indicating either the first and third mode of operations, or the second and fourth mode of operations DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

OTHER EMBODIMENTS

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot.

In some embodiments, a transmission instance may refer to a subframe that contains two slots as describe herein. In another embodiment, a transmission instance may refer to a single slot. In yet other embodiments, a transmission instance may refer to another agreed upon logical time duration that may be allocated for transmission resources.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A method, comprising:
    receiving a scheduling request (SR) allocation having a first period;
    receiving a sounding reference signal (SRS) allocation having a second period;
    transmitting an SR without transmitting an SRS in a transmission instance allocated for both SR and SRS when there is a pending scheduling request; and
    transmitting an SRS without transmitting an SR in the transmission instance allocated for both SR and SRS when there is no pending scheduling request.

2. The method of claim 1, further comprising receiving a control message indicating a mode of operation in the transmission instance allocated for both SR and SRS with a pending scheduling request in the transmission instance, wherein in a first mode of operation, an SR is transmitted without transmitting an SRS in the transmission instance, and wherein in a second mode of operation, both an SR and an SRS are transmitted in the transmission instance.

3. The method of claim 2, wherein the control message indicating the mode of operation is sent to all user equipment within a cell of a wireless network, and wherein the mode of operation is common to all user equipment within the cell of the wireless network.

4. The method of claim 2, wherein the transmission instance comprises a plurality of single carrier frequency division multiple access (SC-FDMA) symbols.

5. The method of claim 4, wherein in the second mode of operation, at least one SC-FDMA symbol is used for the transmission of the SRS and at least another SC-FDMA symbol is used for the transmission of the SR.

6. The method of claim 4, wherein the control message further indicates a mode of operation in a second transmission instance allocated for both acknowledgement/negative-acknowledgment (ACK/NAK) and SRS, wherein in a third mode of operation, an ACK/NAK is transmitted without transmitting an SRS in the second transmission instance, and wherein in a fourth mode of operation, both an ACK/NAK and an SRS are transmitted in the second transmission instance.

7. The method of claim 6, wherein in the fourth mode of operation, at least one SC-FDMA symbol is used for the transmission of the SRS and at least another SC-FDMA symbol is used for the transmission of the ACK/NAK.

8. The method of claim 6, wherein the control message is binary, indicating either the first and third modes of operation, or the second and fourth modes of operation.

9. A method, comprising:
    transmitting to user equipment (UE) a scheduling request (SR) allocation having a first period;
    transmitting to the UE a sounding reference signal (SRS) allocation having a second period;
    receiving from the UE an SR without receiving an SRS in a transmission instance allocated for both SR and SRS when there is a pending scheduling request; and
    receiving from the UE an SRS without receiving an SR in the transmission instance allocated for both SR and SRS when there is no pending scheduling request.

10. The method of claim 9, further comprising transmitting to the UE a control message indicating a mode of operation in transmission instance allocated for both SR and SRS with a pending scheduling request in the transmission instance, wherein in a first mode of operation, an SR is received without receiving an SRS in the transmission instance, and wherein in a second mode of operation, both an SR and an SRS are received in the transmission instance.

11. The method of claim 10, wherein the control message indicating the mode of operation is sent to all user equipment within a cell of a wireless network, and wherein the mode of operation is common to all user equipment within the cell of the wireless network.

12. The method of claim 10, wherein the transmission instance comprises a plurality of single carrier frequency division multiple access (SC-FDMA) symbols.

13. The method of claim 12, wherein in the second mode of operation, transmission of the SR comprises at least one SC-FDMA symbol and transmission of the SRS comprises at least another SC-FDMA symbol.

14. The method of claim 12, wherein the control message further indicates a mode of operation in a second transmission instance allocated for both acknowledgement/negative-acknowledgment (ACK/NAK) and SRS, wherein in a third mode of operation, an ACK/NAK is received from the UE without receiving an SRS in the second transmission instance, and wherein in a fourth mode of operation, both an ACK/NAK and an SRS are received from the UE in the second transmission instance.

15. The method of claim 14, wherein in the fourth mode of operation, transmission of the SRS comprises at least one SC-FDMA symbol and transmission of the ACK/NAK comprises at least another SC-FDMA symbol.

16. The method of claim 14, wherein the control message is binary, indicating either the first and third modes of operation, or the second and fourth modes of operation.

17. A user equipment (UE), comprising:
    a receiver configured to receive a scheduling request (SR) allocation having a first period, and receive a sounding reference signal (SRS) allocation having a second period; and
    a transmitter configured to transmit an SR without transmitting an SRS in a transmission instance allocated for both SR and SRS when there is a pending scheduling request, and transmit an SRS without transmitting an SR in the transmission instance allocated for both SR and SRS when there is no pending scheduling request.

18. The UE of claim 17, wherein the receiver is further configured to receive a control message indicating a mode of operation in the transmission instance allocated for both SR and SRS with a pending scheduling request in the transmission instance, wherein in a first mode of operation, an SR is transmitted without transmitting an SRS in the transmission instance, and wherein in a second mode of operation, both an SR and an SRS are transmitted in the transmission instance.

19. The UE of claim 18, wherein the control message indicating the mode of operation is sent to all user equipment within a cell of a wireless network, and wherein the mode of operation is common to all user equipment within the cell of the wireless network.

20. The UE of claim 18, wherein the transmission instance comprises a plurality of single carrier frequency division multiple access (SC-FDMA) symbols.

21. The UE of claim 20, wherein in the second mode of operation, at least one SC-FDMA symbol is used for transmitting the SRS and at least another SC-FDMA symbol is used for transmitting the SR.

22. The UE of claim 20, wherein the control message further indicates a mode of operation in a second transmission instance allocated for both acknowledgement/negative-acknowledgment (ACK/NAK) and SRS, wherein in a third mode of operation, an ACK/NAK is transmitted without transmitting an SRS in the second transmission instance, and wherein in a fourth mode of operation, both an ACK/NAK and an SRS are transmitted in the second transmission instance.

23. The UE of claim 22, wherein in the fourth mode of operation, at least one SC-FDMA symbol is used for transmitting the SRS and at least another SC-FDMA symbol is used for transmitting the ACK/NAK.

24. The UE of claim 22, wherein the control message is binary, indicating either the first and third modes of operation, or the second and fourth modes of operation.

25. A base station, comprising:
a transmitter configured to transmit to user equipment (UE) a scheduling request (SR) allocation having a first period, and transmit to the UE a sounding reference signal (SRS) allocation having a second period; and
a receiver configured to, when there is a pending scheduling request, receive from the UE an SR without receiving an SRS in a transmission instance allocated for both SR and SRS, and further configured to, when there is no pending scheduling request, receive from the UE an SRS without receiving an SR in the transmission instance allocated for both SR and SRS.

26. The base station of claim 25, wherein the transmitter is further configured to transmit to the UE a control message indicating a mode of operation in the transmission instance allocated for both SR and SRS with a pending scheduling request in the transmission instance, wherein in a first mode of operation, an SR is received without receiving an SRS in the transmission instance, and wherein in a second mode of operation, both an SR and an SRS are received in the transmission instance.

27. The base station of claim 26, wherein the control message indicating the mode of operation is sent to all user equipment within a cell of a wireless network, and wherein the mode of operation is common to all user equipment within the cell of the wireless network.

28. The base station of claim 26, wherein the transmission instance comprises a plurality of single carrier frequency division multiple access (SC-FDMA) symbols.

29. The base station of claim 28, wherein in the second mode of operation, transmission of the SR comprises at least one SC-FDMA symbol and transmission of the SRS comprises at least another SC-FDMA symbol.

30. The base station of claim 28, wherein the control message further indicates a mode of operation in a second transmission instance allocated for both acknowledgement/negative-acknowledgment (ACK/NAK) and SRS, wherein in a third mode of operation, an ACK/NAK is received from the UE without receiving an SRS in the second transmission instance, and wherein in a fourth mode of operation, both an ACK/NAK and an SRS are received from the UE in the second transmission instance.

31. The base station of claim 30, wherein in the fourth mode of operation, transmission of the SRS comprises at least one SC-FDMA symbol and transmission of the ACK/NAK comprises at least another SC-FDMA symbol.

32. The base station of claim 30, wherein the control message is binary, indicating either the first and third modes of operation, or the second and fourth modes of operation.

* * * * *